(12) United States Patent
Kim (10) Patent No.: US 10,622,645 B2
(45) Date of Patent: Apr. 14, 2020

(54) ASSEMBLY SYSTEM THAT ASSEMBLES INSULATING PLATE AND MOUNTING BAR, AND ASSEMBLY METHOD

(71) Applicants: Hyundai Motor Company, Seoul (KR); Kia Motors Corporation, Seoul (KR)

(72) Inventor: Min Pyo Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 252 days.

(21) Appl. No.: 15/662,191

(22) Filed: Jul. 27, 2017

(65) Prior Publication Data

US 2018/0159150 A1 Jun. 7, 2018

(30) Foreign Application Priority Data

Dec. 6, 2016 (KR) .................. 10-2016-0165276

(51) Int. Cl.
| | |
|---|---|
| *H01M 8/248* | (2016.01) |
| *H01M 8/241* | (2016.01) |
| *H01M 8/2404* | (2016.01) |
| *H01M 8/1018* | (2016.01) |
| *H01M 8/0297* | (2016.01) |
| *B23P 21/00* | (2006.01) |

(Continued)

(52) U.S. Cl.
CPC ......... *H01M 8/0297* (2013.01); *H01M 8/241* (2013.01); *H01M 8/2404* (2016.02); *H01M 8/248* (2013.01); *B23P 19/001* (2013.01); *B23P 19/008* (2013.01); *B23P 21/002* (2013.01); *B23P 21/008* (2013.01); *H01M 10/0404* (2013.01); *H01M 2008/1095* (2013.01); *H01M 2250/20* (2013.01); *Y02T 90/32* (2013.01)

(58) Field of Classification Search
CPC ..... B23P 19/001; B23P 19/002; B23P 19/004; B23P 19/007; B23P 19/008; B23P 19/10; B23P 21/002; B23P 21/008; H01M 8/0297; H01M 10/0404
See application file for complete search history.

(56) References Cited

FOREIGN PATENT DOCUMENTS

| | | |
|---|---|---|
| JP | 2013-219028 A | 10/2013 |
| JP | 5664372 B2 | 2/2015 |
| KR | 10-0837904 B1 | 6/2008 |

(Continued)

OTHER PUBLICATIONS

Machine Translation of Japanese Patent Publication No. JP 2012-195180 A (Year: 2012).*

*Primary Examiner* — Christopher J Besler
(74) *Attorney, Agent, or Firm* — Morgan, Lewis & Bockius LLP (57) ABSTRACT

An assembly system that assembles insulation plates and mounting bars to a stack may include a stack transferring device that discharges a stack pressed by a stack pressing device to the outside; an insulation plate attaching device that attaches insulation plates to a first opposite side and a second opposite side of the stack that is discharged to the outside by the stack transferring device; a mounting bar attaching device that attaches mounting bars to the stack to which the insulation plates are attached; and a bolt assembling device that assembles bolts to the mounting bars that are attached to the stack.

11 Claims, 11 Drawing Sheets

(51) Int. Cl.
*B23P 19/00* (2006.01)
*H01M 10/04* (2006.01)

(56) References Cited

FOREIGN PATENT DOCUMENTS

| | | |
|---|---|---|
| KR | 10-2009-0106217 A | 10/2009 |
| KR | 10-2012-0046658 A | 5/2012 |
| KR | 10-2013-0082410 A | 7/2013 |
| KR | 10-2016-0069879 A | 6/2016 |

\* cited by examiner

ASSEMBLY SYSTEM THAT ASSEMBLES INSULATING PLATE AND MOUNTING BAR, AND ASSEMBLY METHOD

CROSS-REFERENCE TO RELATED APPLICATION

The present application claims priority to and the benefit of Korean Patent Application No. 10-2016-0165276 filed on Dec. 6, 2016, the entire contents of which are incorporated herein by reference.

BACKGROUND OF THE INVENTION

Field of the Invention

The present invention relates to an assembly system that assembles an insulation plate and a mounting bar to a stack that is pressed by a pressing device, and an assembly method.

Description of Related Art

A fuel cell vehicle uses electricity generated from an electrochemical reaction between hydrogen and oxygen as an energy source.

Unlike an existing internal combustion engine vehicle that acquires driving power, the fuel cell vehicle is driven by use of electrical energy generated from an electrochemical reaction between supplied hydrogen and oxygen in the air in a fuel cell stack.

That is, the fuel cell system directly converts energy of fuel into electrical energy, and an anode and a cathode, which are provided as a pair, are disposed interposing an electrolyte therebetween, and electricity and heat are produced together through an electrochemical reaction of an ionized fuel gas.

With merits of a high current density, a low driving temperature, less corrosion, and less electrolyte loss, a polymer electrolyte fuel cell has been developed for military purpose or as a spacecraft power source, and recently, researches are underway to apply a polymer electrolyte fuel cell as a vehicle power source.

A fuel cell stack of the fuel cell system is formed by stacking a membrane electrode assemble (MEA), a separator, and the like.

Since the fuel cell stack is manufactured by sequentially stacking a plurality of parts, the parts may be misaligned or the stacking order of the parts may be disordered, thereby causing critical damage to product performance.

In addition, stack cells of a small module unit are transferred to the assembly device and insulation plates and mounting bars are manually assembled by a worker, thereby resulting in a low automation ratio, low productivity, and poor assembly.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an assembly system that discharges a stack from a stack pressing device that compresses a layered stack, assembles insulation plates and mounting bars to the discharged stack, and assembles insulation plates and mounting bars to the stack through automatically fastening bolts or nuts.

An assembly system that assembles insulation plates and mounting bars to a stack according to an exemplary embodiment of the present invention may include a stack transferring device that discharges a stack pressed by a stack pressing device to the outside; an insulation plate attaching device that attaches insulation plates to opposite sides of the stack that is discharged to the outside by the stack transferring device; a mounting bar attaching device that attaches mounting bars to the stack to which the insulation plates are attached; and a bolt assembling device that assembles bolts to the mounting bars that are attached to the stack.

The stack transferring device may include: a transferring rail; a transferring arm mounted to the transferring rail and having a mounting jig where the stack is mounted; and a mounting jig transferring device that transfers the transferring arm where the mounting jig is formed while moving along the transferring rail.

The assembly system that assembles the insulation plates and the mounting bars to the stack may further include a rotation device that rotates the stack mounted to the transferring arm at a predetermined angle.

The insulation plate attaching device may include: an insulation plate magazine where the insulation plates are loaded; insulation plate adsorption members that are set to adsorb the insulation plates loaded in the insulation plate magazine; an insulation plate mounting arm where the insulation plate adsorption members are disposed in lateral sides thereof; and insulation plate rotation devices that are set to rotate the insulation plate adsorption members.

The assembly system that assembles the insulation plates and the mounting bars to the stack may further include: insulation plate transferring units that are provided in the insulation plate mounting arm to transfer the insulation plate adsorption members; an arm transferring device that transfers the insulation plate mounting arm along an arm transferring rail; and a vertical location adjusting device that is provided to connect the arm transferring rail and the insulation plate mounting arm and adjust a distance between the arm transferring rail and the insulation plate mounting arm.

The mounting bar attaching device may include: a mounting bar magazine where the mounting bars are loaded; a mounting bar adsorption member that is provided to adsorb the mounting bars loaded in the mounting bar magazine; a mounting bar rotation device that is provided to rotate the mounting bar adsorption member; and a mounting bar transferring device that moves the mounting bar adsorption member in a vertical direction thereof and a horizontal direction thereof along a vertical rail or a horizontal rail.

The bolt assembling device may include: a bolt feeder that feeds bolts to fix the mounting bars to the stack; a runner arm through which the bolt supplied from the bolt feeder is transferred; and a bolt runner that is provided at a front end portion of the runner arm and assembles the mounting bars to the stack by rotating the bolts transferred along the runner arm.

The bolt assembling device may include a bolt runner transferring device that moves the runner arm in a vertical or horizontal direction.

The bolt runner transferring device may move the runner arm along a horizontal rail and a vertical rail through which the runner arm moves in the horizontal direction and the vertical direction.

The assembly system that assembles the insulation plates and the mounting bars to the stack may include a runner rotation device that provides a torque for the runner arm to rotate the bolt runner.

The assembly system that assembles the insulation plates and the mounting bars to the stack may further include: clamps that temporarily fix the insulation plates to the stack while the insulation plates are attached to the stack; and clamping cylinders that are provided to move the clamps in a predetermined direction.

According to another exemplary embodiment of the present invention, a method for assembling insulation plates and mounting bars to a stack is provided. The method may include moving a stack pressed by a pressing device to the outside; attaching the insulation plates to the stack; attaching the mounting bars that fix the insulation plates to the stack; and assembling bolts to fix the mounting bars to the stack.

The method for assembling the insulation plates and the mounting bars to the stack may further include moving the stack where the mounting bars and the insulation plates are attached to a post process.

The method for assembling the insulation plates and the mounting bars to the stack may further include transferring bolts to a runner to tighten the bolts.

In the attaching of the insulation plates to the stack, one insulation plate may be attached to one side of the stack and another insulation plate may be attached to the other side of the stack.

The method for assembling the insulation plates and the mounting bars to the stack may further include temporarily fixing the insulation plates to prevent the insulation plates from being detached.

In the assembling of the bolts, a runner may rotate the bolts at a predetermined location where the bolts are assembled.

The mounting bars may be adsorbed from a magazine and moved to be attached to the stack.

According to the exemplary embodiment of the present invention, the stack can be automatically discharged from the stack pressing device, and the insulation plates can be attached to opposite sides of the stack and fixed to the stack stably by use of the mounting bars, preventing quality deterioration and occurrence of leakage.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

In addition, the size and thickness of each configuration shown in the drawings are arbitrarily shown for understanding and ease of description, but the present invention is not limited thereto, and the thickness of layers, films, panels, regions, etc., are exaggerated for clarity.

However, parts that are irrelevant to the description are omitted to clearly describe the exemplary embodiments of the present invention, and like reference numerals designate like elements throughout the specification, which also applies to the related art.

In the following detailed description, terms including first and second are used to distinguish between elements that respectively have the same constructions, and thus the elements are not limited to such order.

Figure 1:
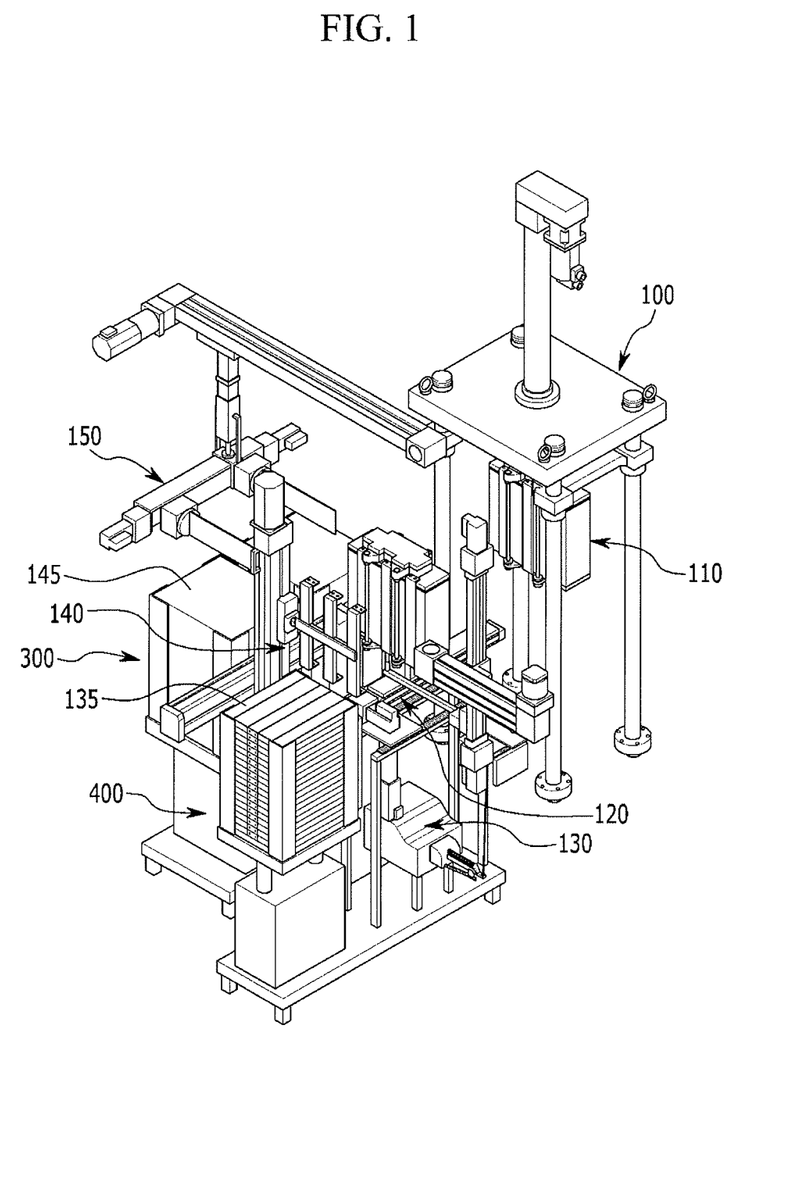
FIG. 1 is a perspective view of an assembly system that assembles an insulation plate and a mounting bar to a stack according to an exemplary embodiment of the present invention.

FIG. 1 is a perspective view of an assembly system that assembles an insulation plate and a mounting bar to a stack according to an exemplary embodiment of the present invention.

Referring to FIG. 1, an assembly system includes a stack pressing device 100, a stack transferring device 120, a bolt assembling device 130, a mounting bar attaching device 140, and an insulation plate attaching device 150.

The stack pressing device 100 presses the stack 110 and lifts the pressed stack 110. The stack transferring device 120 is assembled to a lower portion of the stack 110 that is disposed in an upper portion of the stack pressing device 100, and discharges the stack 110 to the outside from the stack pressing device 100.

The insulation plate attaching device 150 adsorbs insulation plates 145 located in an insulation plate magazine 300 from opposite sides to attach the insulation plates 145 to opposite sides of the stack 110, and the mounting bar attaching device 140 adsorbs mounting bars 135 located in a mounting bar magazine 400 to attach the adsorbed mounting bars 135 to respective sides of the stack 110.

The bolt assembling device 130 inserts bolts supplied from a bolt feeder 500 (refer to FIG. 5) to opposite end portions of the mounting bar 135 and rotates the bolts to fix the mounting bar 135 to the stack 110.

In the exemplary embodiment of the present invention, the stack 110 can be automatically discharged from the stack pressing device 100, the insulation plates 145 can be automatically attached to opposite sides of the stack 110, and the insulation plates 145 can be stably and automatically fixed to the stack 110 by use of the insulation plates 145.

Figure 2:
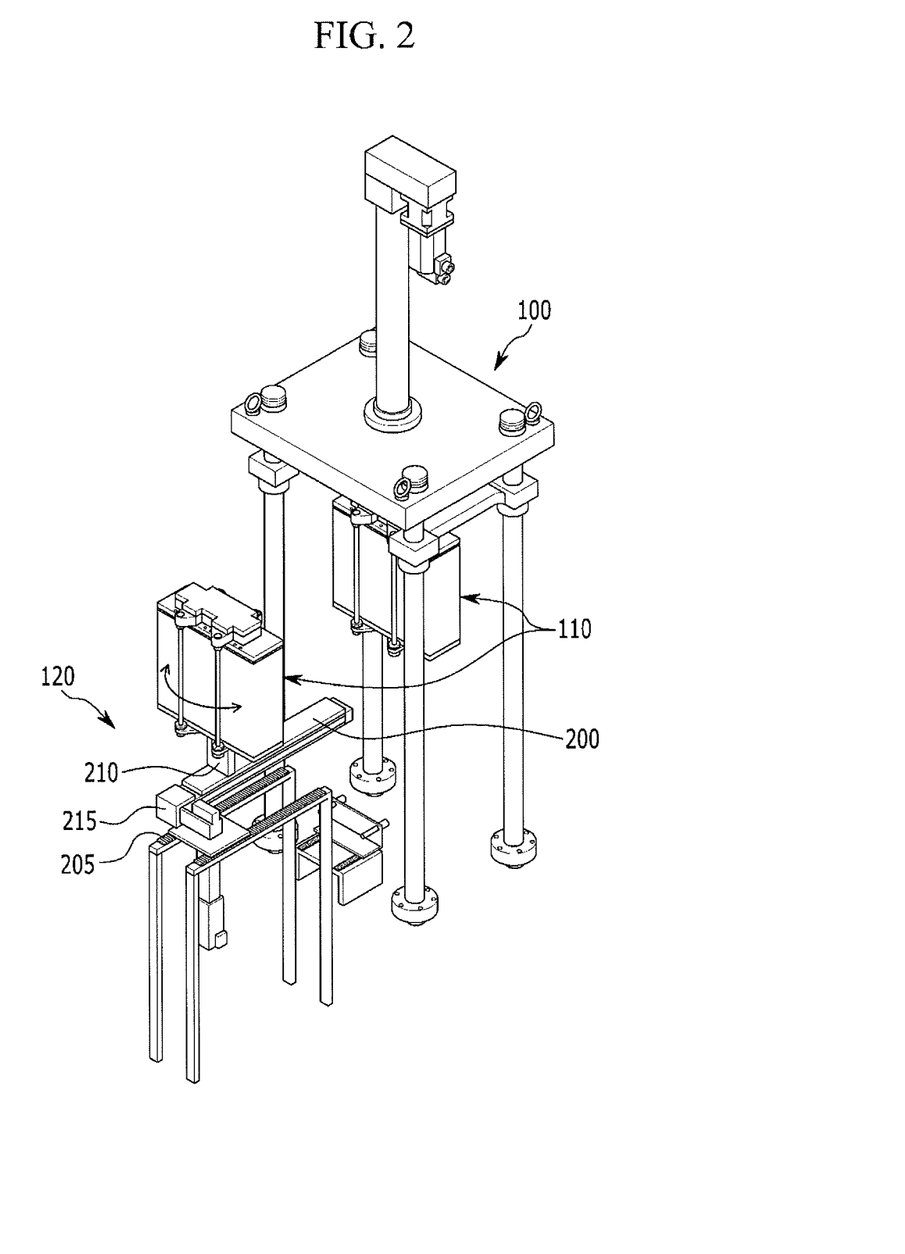
FIG. 2 is a perspective view of a stack transferring device according to the exemplary embodiment of the present invention.

FIG. 2 is a perspective view of a stack transferring device according to the exemplary embodiment of the present invention.

Referring to FIG. 2, the transferring device 120 includes a transferring arm 200, a transferring rail 205, a mounting jig 215, and a mounting jig transferring device 210.

The transferring arm 200 moves along the transferring rail 205, and the transferring arm 200 may be inserted into the stack pressing device 100 or may move to the outside.

Figure 7:
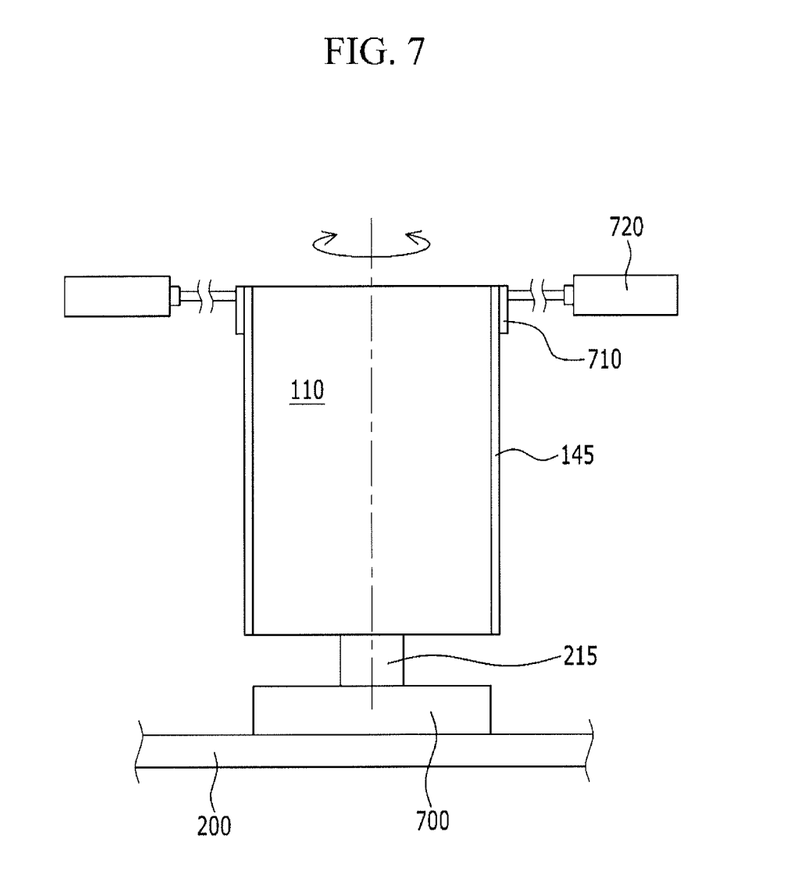
FIG. 7 is a side view of a structure for temporarily fixing the insulation plates to the stack and a structure for rotating the stack according to the exemplary embodiment of the present invention.

The mounting jig 215 is provided in one upper side of the transferring arm 200, and the stack 110 is mounted to the mounting jig 215 and then fixed thereto. The stack 110 disposed in the mounting jig 215 may be rotated by a rotation device 700 as shown in FIG. 7.

The mounting jig transferring device 210 may enable the transferring arm 200 to move along the transferring rail 205 by use of a step motor and the like.

Figure 6:
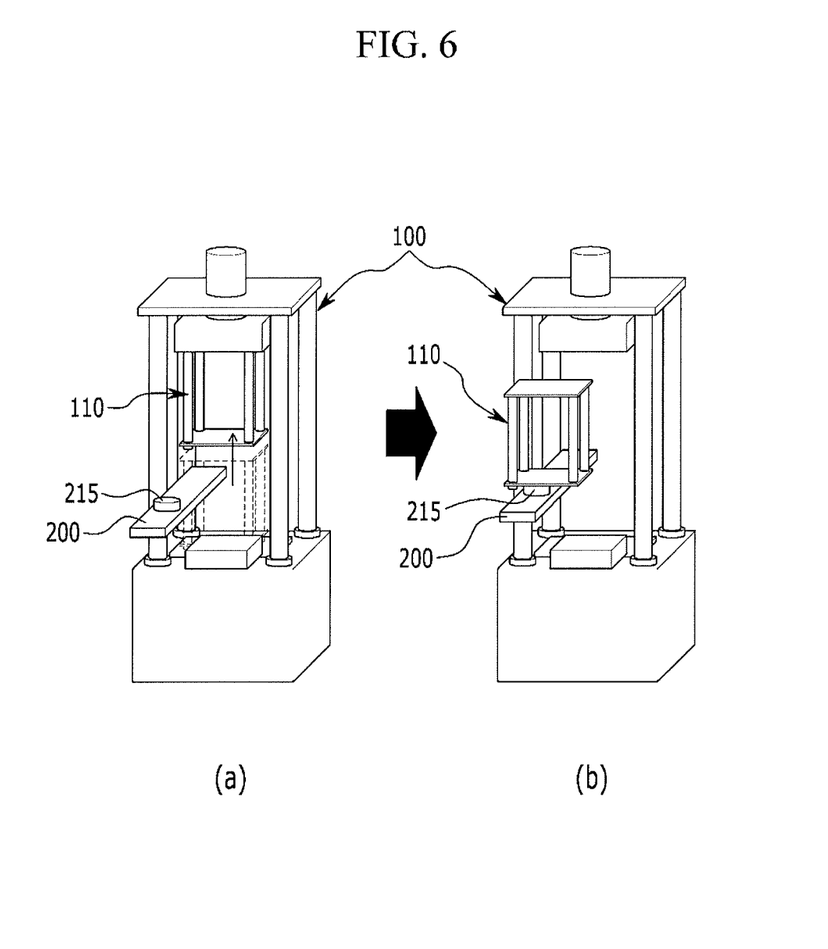
FIG. 6 is a perspective view of a method for the stack transferring device to discharge the stack according to the exemplary embodiment of the present invention.

FIG. 6 is a perspective view of a method for the stack transferring device to discharge the stack according to the exemplary embodiment of the present invention.

Referring to FIG. 6, the transferring arm 200 moves into the stack pressing device 100, and a lower portion of the stack 110 is assembled with the stack mounting jig 215 of the transferring arm 200. The stack 110 is separated from the stack pressing device 100, and the transferring arm 200 moves to discharge the stack 110 to the outside.

In the exemplary embodiment of the present invention, a structure of the stack pressing device 100 is known technology and therefore the description thereof will be omitted.

Figure 3:
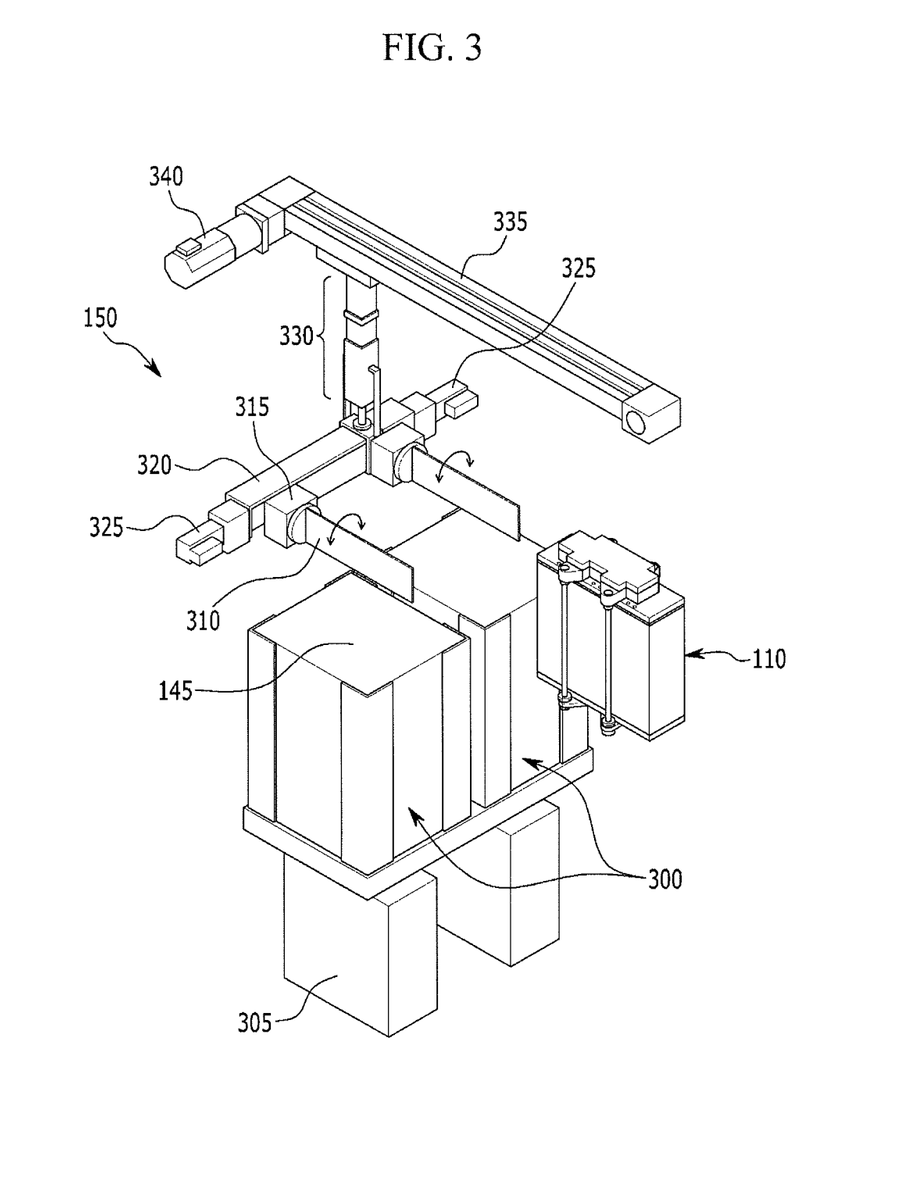
FIG. 3 is a perspective view of an insulation plate attaching device according to the exemplary embodiment of the present invention.

FIG. 3 is a perspective view of the insulation plate attaching device according to the exemplary embodiment of the present invention.

Referring to FIG. 3, the insulation plate attaching device 150 includes the insulation plate magazines 300, an auto-lifting device 305, an insulation plate adsorption member 310, an insulation plate rotation device 315, an insulation plate mounting arm 320, an insulation plate transferring device 325, a vertical location adjusting device 330, an arm transferring rail 335, and an arm transferring device 340.

The insulation plates 145 are loaded in the insulation plate magazines 300, and the auto-lifting device 305 maintains a constant height of an upper surface of the insulation plate 145 according to a use amount.

The insulation plate rotation device 315 is fixed to one side of the insulation plate mounting arm 320 while having a predetermined distance therebetween, and the insulation plate adsorption members 310 are provided in the insulation plate rotation devices 315. The insulation plate adsorption members 310 disposed in lateral sides are parallel with each other.

The insulation plate transferring units 325 are provided in the insulation plate mounting arm 320 to adjust a distance between the insulation plate adsorption members 310. The arm transferring rail 335 is provided in an upper side of the insulation plate mounting arm 320 in a direction that is perpendicular to the insulation plate mounting arm 320, and the vertical location adjusting device 330 connects the upper portion of the insulation plate mounting arm 320 and the arm transferring rail 335.

The vertical location adjusting device 330 is disposed to be movable along the arm transferring rail 335, and the arm transferring device 340 can move the insulation plate mounting arm 320 by moving the vertical location adjusting device 330 along the arm transferring rail 335.

The vertical location adjusting device 330 may be telescopic to be adjustable in length like an antenna.

Figure 8:
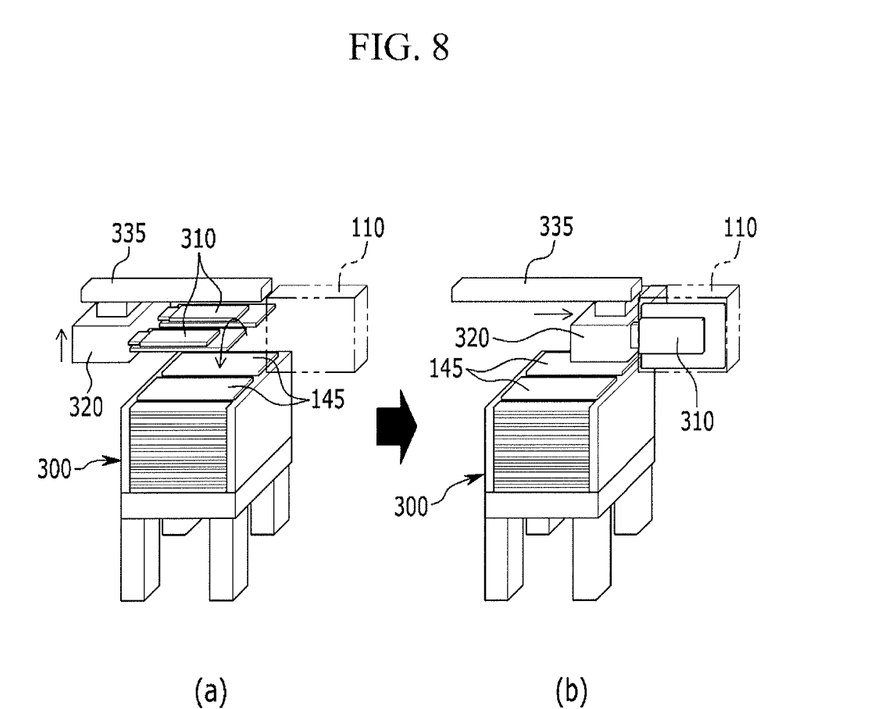
FIG. 8 is a perspective view of an operation method of an insulation plate attaching device according to the exemplary embodiment of the present invention.

FIG. 8 is a perspective view of an operation method of the insulation plate attaching device according to the exemplary embodiment of the present invention.

Referring to FIG. 8, when the insulation plate adsorption members 310 move above the insulation plate magazine 300 by the insulation plate transferring device 325, the insulation plate adsorption member 310 descends by way of the insulation plate rotation device 315 while adsorption surfaces of the insulation plate adsorption members 310 adsorb the insulation plates 145.

Next, when the insulation plate adsorption member 310 moves to lateral sides of the stack 110 and the insulation plate rotation device 315 rotates the insulation plate adsorption member 310, the insulation plate adsorption members 310 attach the insulation plates 145 to the opposite sides of the stack 110.

Figure 4:
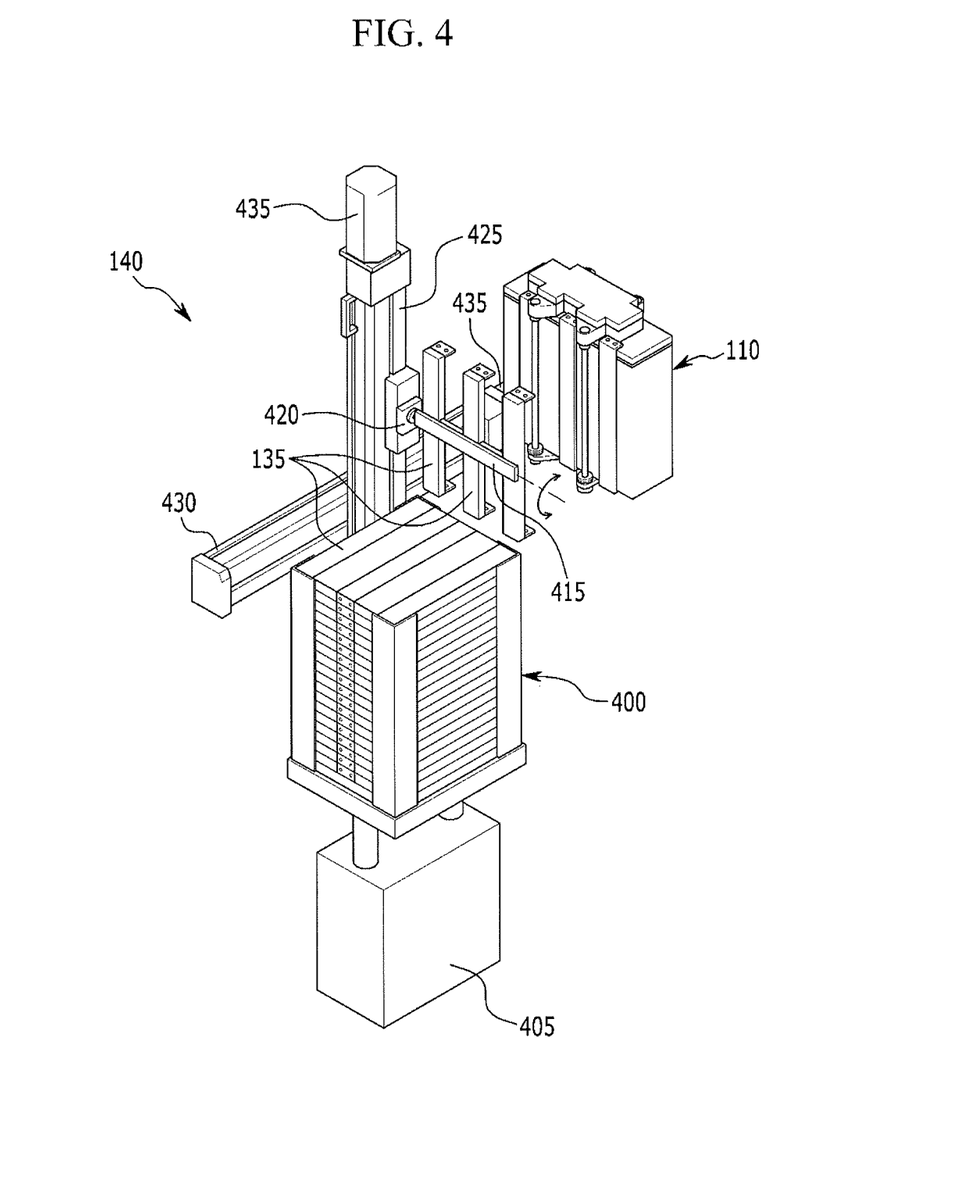
FIG. 4 is a perspective view of a mounting bar attaching device according to the exemplary embodiment of the present invention.

FIG. 4 is a perspective view of the mounting bar attaching device according to the exemplary embodiment of the present invention.

Referring to FIG. 4, the mounting bar attaching device 140 includes the mounting bar magazine 400, an auto-lifting device 405, a mounting bar adsorption member 415, a mounting bar rotation device 420, a horizontal transferring rail 430, a vertical transferring rail 425, and a mounting bar transferring device 435.

The mounting bar 135 is loaded in the mounting bar magazine 400, and the auto-lifting device 405 maintains a constant height of the mounting bar 135. A structure for the mounting bar 135 to maintain the constant height will refer to prior arts.

The mounting bar adsorption member 415 is disposed to adsorb a plurality of mounting bars 135 that are loaded in the mounting bar magazine 400, for example, three mounting bars 135, and the mounting bar rotation device 420 is disposed to rotate the mounting bar adsorption member 415.

The mounting bar rotation device 420 is disposed to be vertically movable in the vertical transferring rail 425, and the mounting bar transferring device 435 provides a torque to vertically move the mounting bar rotation device 420 using a step motor and the like.

The vertical transferring rail 425 is disposed to be horizontally movable in the horizontal transferring rail 430.

Thus, the mounting bar adsorption member 415 moves along the horizontal transferring rail 430 and the vertical transferring rail 425 and adsorbs the mounting bars 135 at a predetermined location by being rotated by the mounting bar rotation device 420 to attach the mounting bars 135 to one side of the stack 110.

Figure 9:
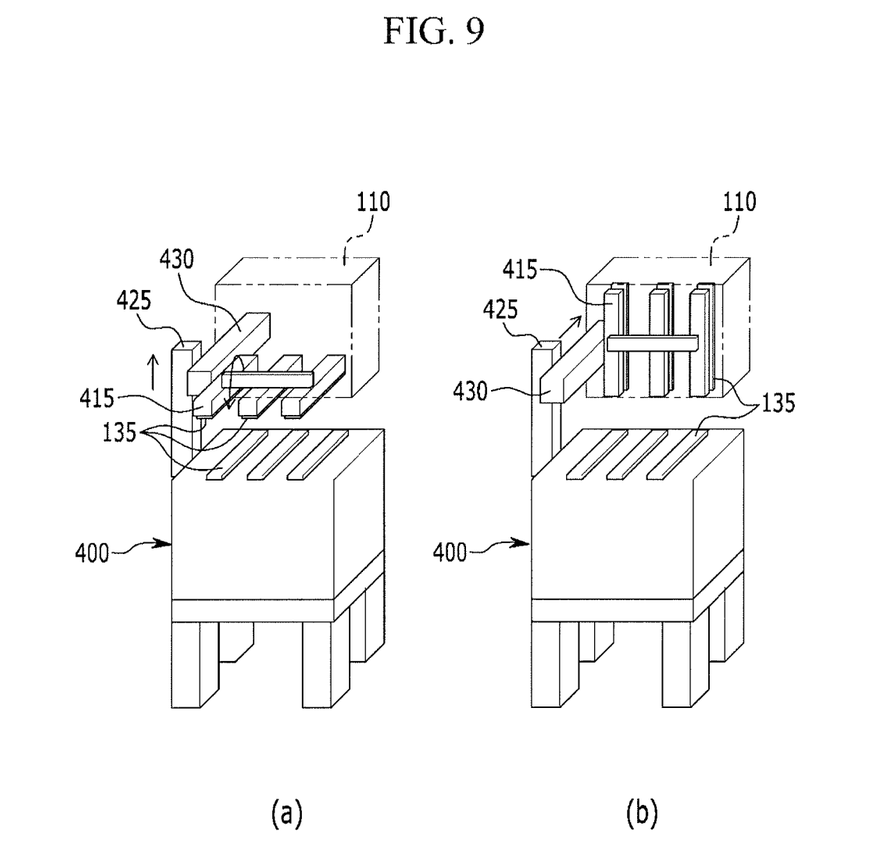
FIG. 9 is a perspective view of an operation method of a mounting bar attaching device according to the exemplary embodiment of the present invention.

FIG. 9 is a perspective view of an operation of the mounting bar attaching device according to the exemplary embodiment of the present invention.

Referring to FIG. 9, the mounting bar adsorption members 415 move above the mounting bar magazine 400 to adsorb the upper surfaces of the mounting bars 135, and move and rotate to attach the mounting bars 135 to one side of the stack 110.

Subsequently, the stack 110 rotates 180 degrees by way of the rotation device 700 (refer to FIG. 7), and then the mounting bar adsorption members 415 attach the mounting bars 135 to the other side of the stack 110.

Figure 5:
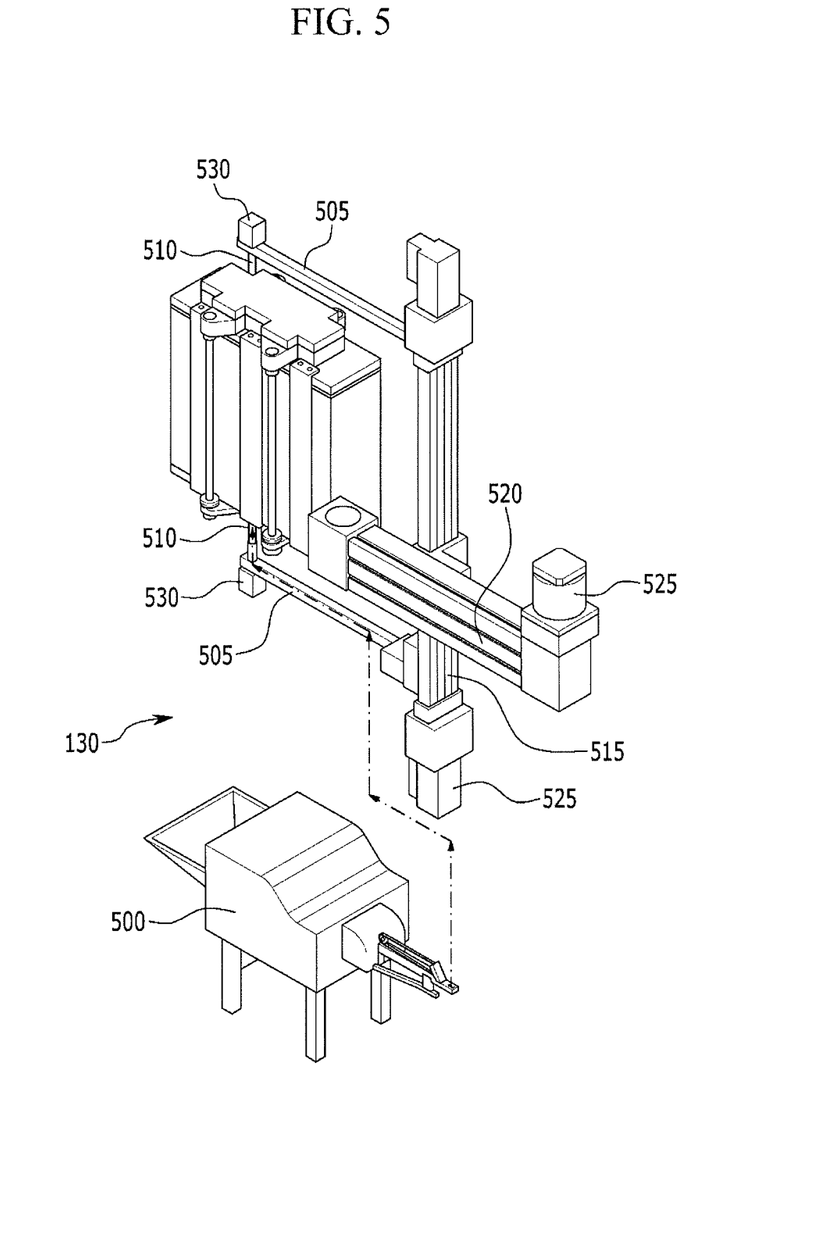
FIG. 5 is a perspective view of a bolt assembling device according to the exemplary embodiment of the present invention.

FIG. 5 is a perspective view of the bolt assembling device according to the exemplary embodiment of the present invention.

Referring to FIG. 5, the bolt assembling device 130 includes the bolt feeder 500, a bolt runner 510, a runner arm 505, a vertical transferring rail 515, a horizontal transferring rail 520, a bolt runner transferring device 525, and a bolt runner rotation device 530.

The bolt runner 510 is disposed at a front end portion of the runner arm 510, and a rear end portion of the runner arm 505 is disposed in the vertical transferring rail 515. The runner arm 505 is vertically movable along the vertical transferring rail 515.

The vertical transferring rail 515 is connected to the horizontal transferring rail 520 and thus is movable in a horizontal direction. That is, the bolt runner 510 is movable in a horizontal direction and a vertical direction.

The bolt runner transferring device 525 provides a torque using a step motor and the like to transfer the vertical transferring rail 515 in the horizontal direction or transfer the runner arm 505 in the horizontal direction.

The bolt feeder 500 is set to sequentially feed a predetermined specification of bolts, and the bolt moves to an end portion of the bolt runner 510 by air pressure and is inserted into a bolt hole formed in each mounting bar 135 and then screw-assembled to an end portion plate 12 (refer to FIG. 10) of the stack 110 by rotation of the bolt runner 510.

As illustrated, the bolt runner rotation device 530 that rotates the bolt runner 510 is provided at the opposite side of the runner arm 505.

FIG. 7 is a side view of a structure for temporarily fixing the insulation plate to the stack and a structure for rotating the stack.

Referring to FIG. 7, the insulation plates 145 are attached to the opposite sides of the stack 110, and clamping cylinders 720 push clamps 710 to the insulation plates 145 to closely attach the insulation plates 145 to the stack 110. In such a state, the mounting bars 135 are assembled and fixed by bolts. Then, the clamps 710 are separated from the insulation pates 145.

The rotation device 700 is disposed at one side of the transferring arm 200, and the stack mounting jig 215 is formed in the rotation device 700. Then, the stack 110 is mounted to the stack mounting jig 215. The rotation device 700 rotates the stack 110 at a predetermined angle to effectively attach the insulation plates 145 and the mounting bars 135 to opposite sides of the stack 110.

Figure 10:
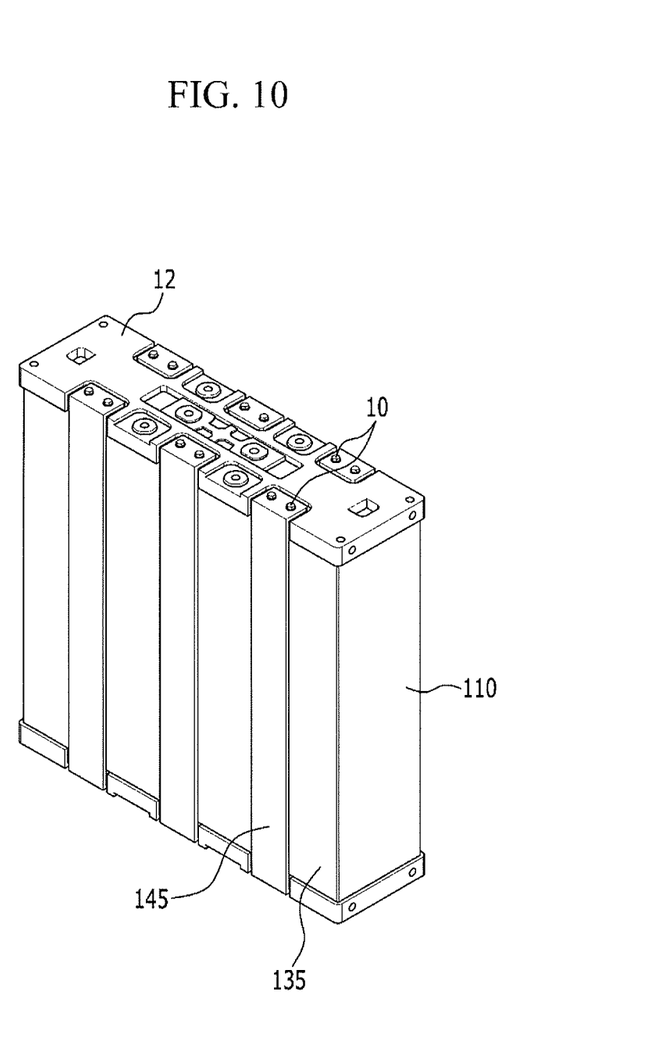
FIG. 10 is a perspective view of the stack according to the exemplary embodiment of the present invention.

FIG. 10 is a perspective view of the stack according to the exemplary embodiment of the present invention.

Referring to FIG. 10, the end portion plates 12 are respectively fixed to the top portion and bottom surfaces of the stack 110, the insulation plates 145 are attached to the opposite sides of the stack 110, and the mounting bars 135 are coupled to the external side of the insulation plates 145.

An upper end portion and a lower end portion of each mounting bar 135 are bent to be attached to the upper side and the lower side of the stack 110, and bolts 10 fix the mounting bar 135 to the end portion plates 12.

Figure 11:
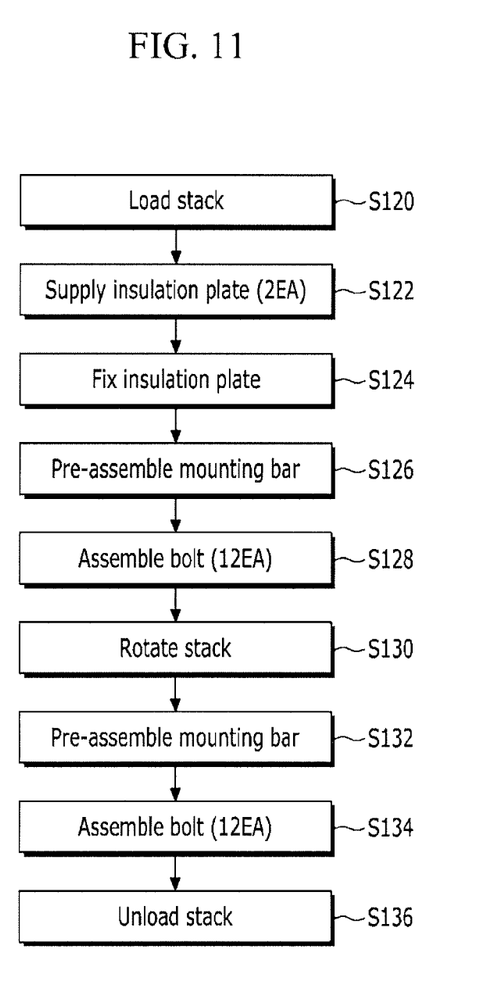
FIG. 11 is a flowchart of a method for assembling the insulation plates and the mounting bars to the stack according to the exemplary embodiment of the present invention.

FIG. 11 is a flowchart of a method for assembling the insulation plates and the mounting bars to the stack according to the exemplary embodiment of the present invention.

The assembly system that assembles the insulation plates and the mounting bars to the stack according to the exemplary embodiment of the present invention includes a controller, and the controller may execute a series of commands for performing a method according to an exemplary embodiment of the present invention.

The controller controls operation of the stack pressing device 100, the stack transferring device 120, the bolt assembling device 130, the mounting bar attaching device 140, and the insulation plate attaching device 150.

Referring to FIG. 11, in S120, the stack is separated from the stack pressing device 100, located to the mounting jig 215 of the transferring arm 200, and then discharged.

In S122, the insulation plate attaching device 150 attaches the insulation plates 145 to the opposite sides of the stack 110. Then, in S124, the clamps 710 closely attach the insulation plates 145 to the stack 110.

The mounting bar attaching device 140 attaches the mounting bars 135 to one side of the stack 110 in S126, and the bolt assembling device 130 assembles the bolts 10 to fix the mounting bars 135 and the insulation plates 145 to the stack 110 in S128.

The rotation device 700 rotates the stack 110 180 degrees in S130, and the mounting bar attaching device 140 attaches the mounting bar 135 to the other side of the stack 110 in S132.

The bolt assembling device 130 assembles the bolts 10 in S134 to fix the mounting bars 135 and the insulation plates 145 to the stack 110.

Then, in S136, the stack transferring device 120 unloads the completed stack 110 from the stack pressing device 100 or unloads the complete stack 110 for an adjacent process.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present inven-

What is claimed is:

1. An assembly system that assembles insulation plates and mounting bars to a stack, comprising:
    a stack transferring device that is configured to discharge the stack pressed by a stack pressing device to an outside thereof;
    an insulation plate attaching device that is configured to attach the insulation plates to a first opposite side and a second opposite side of the stack that is discharged to an outside thereof by the stack transferring device;
    a mounting bar attaching device that is configured to attach the mounting bars to the stack to which the insulation plates are attached; and
    a bolt assembling device that is configured to assemble bolts to the mounting bars that are attached to the stack.

2. The assembly system that assembles the insulation plates and the mounting bars to the stack of claim 1, wherein the stack transferring device comprises:
    a transferring rail;
    a transferring arm mounted to the transferring rail and having a mounting jig where the stack is mounted; and
    a mounting jig transferring device that is configured to transfer the transferring arm where the mounting jig is formed while moving along the transferring rail.

3. The assembly system that assembles the insulation plates and the mounting bars to the stack of claim 2, further including a rotation device that is configured to rotate the stack mounted to the transferring arm at a predetermined angle thereof.

4. The assembly system that assembles the insulation plates and the mounting bars to the stack of claim 1, wherein the insulation plate attaching device comprises:
    an insulation plate magazine where the insulation plates are loaded;
    insulation plate adsorption members that are configured to adsorb the insulation plates loaded in the insulation plate magazine;
    an insulation plate mounting arm where the insulation plate adsorption members are disposed in lateral sides thereof; and
    insulation plate rotation devices that are configured to rotate the insulation plate adsorption members.

5. The assembly system that assembles the insulation plates and the mounting bars to the stack of claim 4, further comprising:
    insulation plate transferring units that are provided in the insulation plate mounting arm to transfer the insulation plate adsorption members;
    an arm transferring device that is configured to transfer the insulation plate mounting arm along an arm transferring rail; and
    a vertical location adjusting device that is provided to connect the arm transferring rail and the insulation plate mounting arm and to control a distance between the arm transferring rail and the insulation plate mounting arm.

6. The assembly system that assembles the insulation plates and the mounting bars to the stack of claim 1, wherein the mounting bar attaching device includes:
    a mounting bar magazine where the mounting bars are loaded;
    a mounting bar adsorption member that is provided to adsorb the mounting bars loaded in the mounting bar magazine;
    a mounting bar rotation device that is provided to rotate the mounting bar adsorption member; and
    a mounting bar transferring device that is configured to move the mounting bar adsorption member in a vertical direction thereof and a horizontal direction thereof along a vertical rail or a horizontal rail.

7. The assembly system that assembles the insulation plates and the mounting bars to the stack of claim 1, wherein the bolt assembling device includes:
    a bolt feeder that is configured to feed bolts to fix the mounting bars to the stack;
    a runner arm through which the bolt supplied from the bolt feeder is configured to be transferred; and
    a bolt runner that is provided at a front end portion of the runner arm and is configured to assemble the mounting bars to the stack by rotating the bolts transferred along the runner arm.

8. The assembly system that assembles the insulation plates and the mounting bars to the stack of claim 7, wherein the bolt assembling device includes a bolt runner transferring device that is configured to move the runner arm in a vertical or horizontal direction thereof.

9. The assembly system that assembles the insulation plates and the mounting bars to the stack of claim 8, wherein the bolt runner transferring device is configured to move the runner arm along a horizontal rail and a vertical rail through which the runner arm is configured to move in a horizontal direction thereof and a vertical direction thereof.

10. The assembly system that assembles the insulation plates and the mounting bars to the stack of claim 7, including a runner rotation device that is configured to provide a torque for the runner arm to rotate the bolt runner.

11. The system that assembles the insulation plates and the mounting bars to the stack of claim 1, further including:
    clamps that is configured to fix the insulation plates for a predetermined time to the stack while the insulation plates are attached to the stack; and
    clamping cylinders that are provided to move the clamps in a predetermined direction thereof.

* * * * *